United States Patent [19]
Kemper

[11] 3,816,972
[45] June 18, 1974

[54] APPARATUS FOR TRANSPORTING CARRIERS THROUGH A FILLING STATION

[76] Inventor: Kate Kemper, Lange Str. 8-10, 4835 Rietberg 2, Germany

[22] Filed: Feb. 9, 1972

[21] Appl. No.: 224,671

[30] Foreign Application Priority Data
Feb. 10, 1971 Germany............................ 2106256

[52] U.S. Cl...................... 53/250, 53/160, 198/110
[51] Int. Cl............................................. B65b 5/10
[58] Field of Search........ 53/160, 246, 250; 198/34, 198/110

[56] References Cited
UNITED STATES PATENTS
2,331,018  10/1943  Fedorchak et al................ 53/160 X
2,751,591  6/1956  Marasso............................... 53/160
3,460,316  8/1969  Mumma............................... 53/160

*Primary Examiner*—Robert L. Spruill
*Attorney, Agent, or Firm*—Spencer & Kaye

[57] ABSTRACT

Apparatus for the transport of carriers intended for the reception of elements to be transported, comprises main drive means for the carriers, additional drive means for varying the transport movement of the carriers and control means for automatically actuating the additional drive means.

12 Claims, 4 Drawing Figures

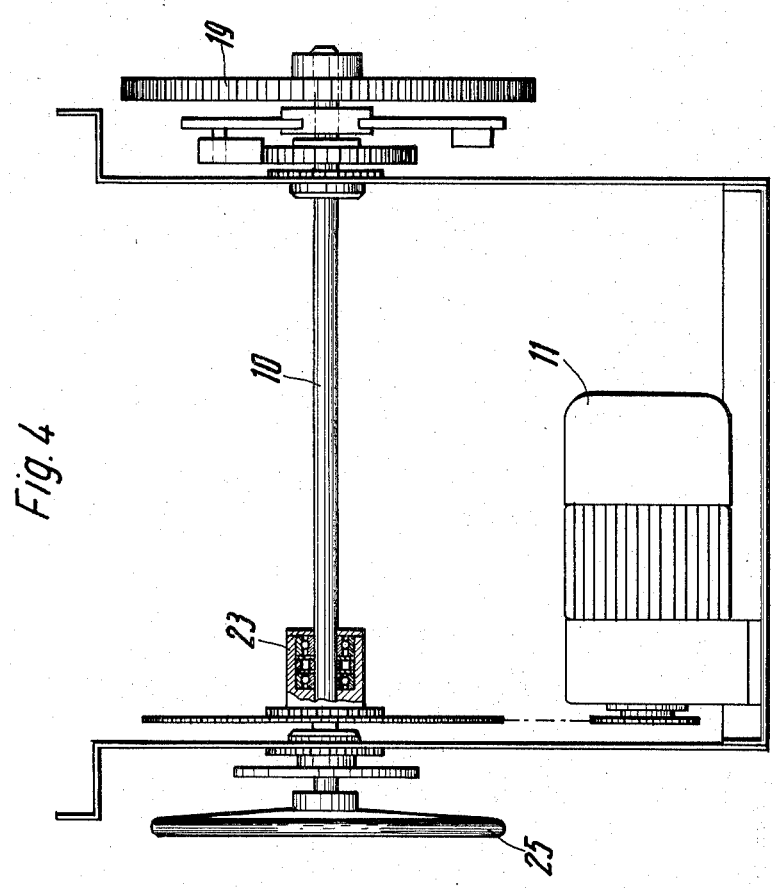

ically only on introduction of a new empty carrier. Thus, the output capacity of such a machine is dependent upon the working rate of the operator, so that such an apparatus cannot be exploited to the maximum.
APPARATUS FOR TRANSPORTING CARRIERS THROUGH A FILLING STATION

BACKGROUND OF THE INVENTION

The invention relates to an apparatus for the transport of carriers intended for the reception of elements to be transported. Such apparatus is used in a combined dough-dividing and handing-up device with filler station for the preparation of dough pieces for the preparation of small loaves or the like.

One known machine of this kind consists of a dough-dividing and handing up device to which a dough means is fed and which delivers handed-up dough pieces to a conveyor belt, which is followed by a rolling-out station with a turning-in device. Such combined dough-dividing and handing-up devices serve especially for the production of small loaves, such as rolls or French rolls.

After the dough pieces have travelled through the rolling staion and the turning-in device, they are laid with their roll joint downwards upon a carrier, which can be provided with rockers. This carrier or rocker carrier is then fed to a proving room and then to a baking oven in which the small loaves are deposited with their roll joint upwards upon a hearth surface, a mechanism situated on the frame of the rocker carrier being actuated for the tipping over of the rockers.

Ovens called peel ovens are also known which are charged from the front with goods for baking. The carriers used for the transport of the goods for baking here have handles so that on the one hand the operator can handle the carrier more easily and on the other hand is not injured by the oven when inserting the goods for baking into the oven. The combined dough-dividing and handing-up devices known hitherto are designed so that in the withdrawal of a carrier the entire installation switches itself off, and switches itself on again automatically only on introduction of a new empty carrier. Thus, the output capacity of such a machine is dependent upon the working rate of the operator, so that such an apparatus cannot be exploited to the maximum.

On the other hand, dough-dividing and handing-up devices have also already been developed where a magazine filled with empty carriers is used, one empty carrier after the other being automatically called forth from the magazine and fed to the filler station. Such apparatus is not readily suitable for the charging of carriers which are equipped at their head sides or ends with handles, so that a continuous charging operation cannot be carried out.

It is also already known in such dough-dividing and handing-up devices to interrupt the entire procedure of work as soon as a carrier is completely filled with dough pieces, and to cause the procedure to start up again only when a new empty carrier has reached the filler station with its surface to be filled. Such discontinuous operation is disadvantageous especially when the time interval between the switching off and switching on of the entire installation is relatively great. Since the working of dough goods involves a substance which is in the process of fermentation, a relatively long interruption is especially disadvantageous for a smooth course of the process, especially in the case of doughs with high yield.

SUMMARY OF THE INVENTION

It is an object of the invention to reduce or avoid the above-mentioned disadvantages.

It is a further object of the invention to enable the combination of a dough-dividing and handing-up device with transport and filling device which can work independently of the working rhythm of an operator, and in so doing can exploit the individual components of the device to the maximum.

It is a still further object of the invention to bring the necessary shut-off times which lie between the departure of a filled carrier from the filler station and the introduction of an empty carrier to a minimum.

It is yet a further object of the invention to permit a nearly continuous operation of the entire installation, a magazine with empty carriers being available, which carriers can be called forth in each case in a continuous sequence and, after passing through the filler station, can be taken to a further magazine consisting of filled carriers.

According to th invention, there is provided apparatus for the transport of carriers intended for the reception of elements to be transported comprising main drive means for said carriers, additional drive means for varying the transport movement of said carriers and control means for automatically actuating said additional drive means.

Further according to the invention, there is provided apparatus for the transport of carriers intended for the reception of elements to be transported comprising a main drive motor for said carriers, a main spindle, a detent disc mounted on said main spindle for rotation therewith, a detent for rotating said detent disc step by step, a linkage operating said detent and driven by said main drive motor, a control disc mounted for rotation with said main spindle, switch elements on said control disc, switches actuatable by said switch elements at predetermined times and an additional drive motor for varying the transport movement of said carriers and actuated by said switches.

BRIEF DESCRIPTION OF THE DRAWINGS

The invention will now be described in greater detail, by way of example, with reference to the drawings, in which :

FIG. 3 shows a plan view of the apparatus according to the invention situated in a dough-dividing and handing-up device and FIG. 4 shows a section taken on the line 4—4 in FIG. 3.

DESCRIPTION OF THE PREFERRED EMBODIMENT

Figure 1:
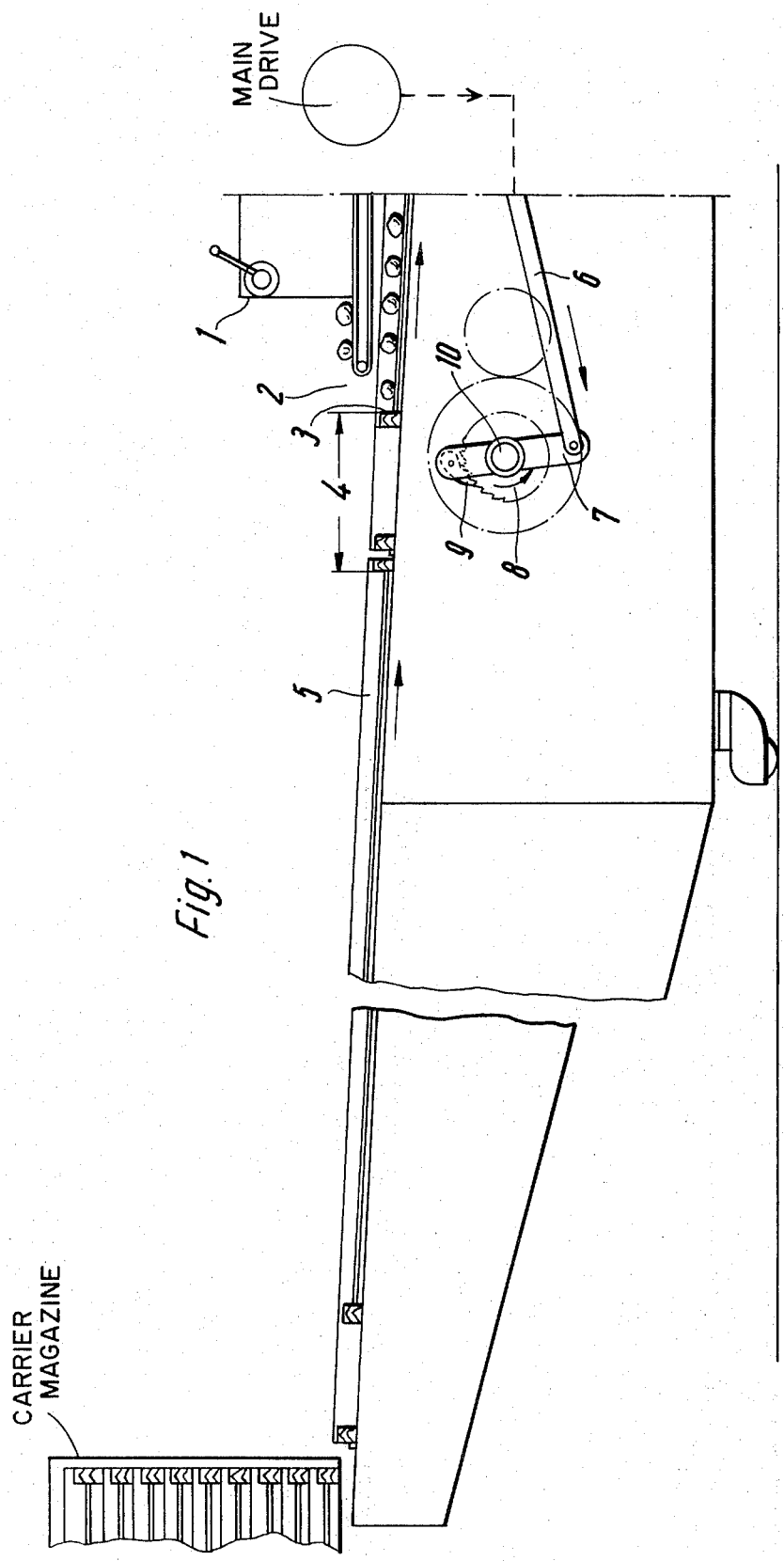
FIG. 1 shows a lateral elevation of a part of a combined dough-dividing and handing-up device with a filler station.

Basically, it is proposed that, in an apparatus for the continuous or step-by-step transport of several carriers intended for the reception of elements, especially in a combined dough-dividing and handing-up device with filler station for the preparation of dough pieces for the production of small loaves or the like, for the achievement of a variation of the transport step length and/or the transport speed of the carrier, additional drive and control devices are arranged for automatic actuation. The additional drive and control devices can be automatically actuable after the elapse of a predetermined transport step length which is dependent upon the dimensions of the carriers, in order to effect a variation of the transport step length and/or of the transport speed of the carriers. The variation of the transport step length and/or of the transport speed of the carriers may take place when an empty position of the carrier or carriers passes the filler station. Control devices may be arranged to act upon the additional drive device, so that the variation of the transport step length and/or transport speed of the carrier or carriers takes place for a predetermined period and the original condition is automatically settable immediately thereafter.

In one particular embodiment of the invention a linkage driven by a main drive motor acts through an engaging finger upon a detent wheel and rotates the spindle connected with it step by step, which spindle in turn comprises a control disc provided with switch elements by which, at predetermined times, suitably arranged switches are actuatable in such a way that a drive motor can be switched on and off to achieve a variation of the transport step length and/or of the transport speed of the carriers. The drive motor, which is provided to achieve a variation of the transport step length and/or of the transport speed, when in the switched-on condition, acts upon a freewheel device which is operatively connected with the main spindle in the drive direction and drives this spindle. The control disc on the main spindle is replaceably arranged. Moreover, the switch elements, formed as cams, are variably arranged on the control disc.

For the transport of the carriers the main spindle is connected through a gearing with a chain drive spindle which drives a chain system. The chain system, serving for the transport of the carriers, comprises, in dependence upon the length of the carriers, engaging members which grasp the carriers. The carriers are fed automatically from a magazine to a filler station. After travelling through the filler station, the carriers can be fed to a further magazine or can be taken directly out of the apparatus by an operator.

In advantageous further development of the invention an adjusting device is so arranged as to be able to act on the main spindle, so that the position of the switch elements on the control disc and that of the engaging members on the chain system can be adjusted to the position of the carriers in relation to the filler station, when the main drive is shut off.

The embodiment which is illustrated in the drawings will now be described.

In the individual Figures the same elements are provided with the same reference numerals.

In FIG. 1 a filler station 1 of a dough-dividing and handing-up device 2 is illustrated. A filled carrier 3 is just leaving this device. Between the carrier 3 and the empty carrier 5, which is moving in the direction of the arrow, there is an empty position 4 which is caused for example by handles on the carriers. A linkage 6 and 7 is moved back and forth, as indicated by the arrow, by means of a main drive only symbolically illustrated, whereby a detent wheel 8 is rotated step by step by means of the engaging finger 9.

Figure 2:
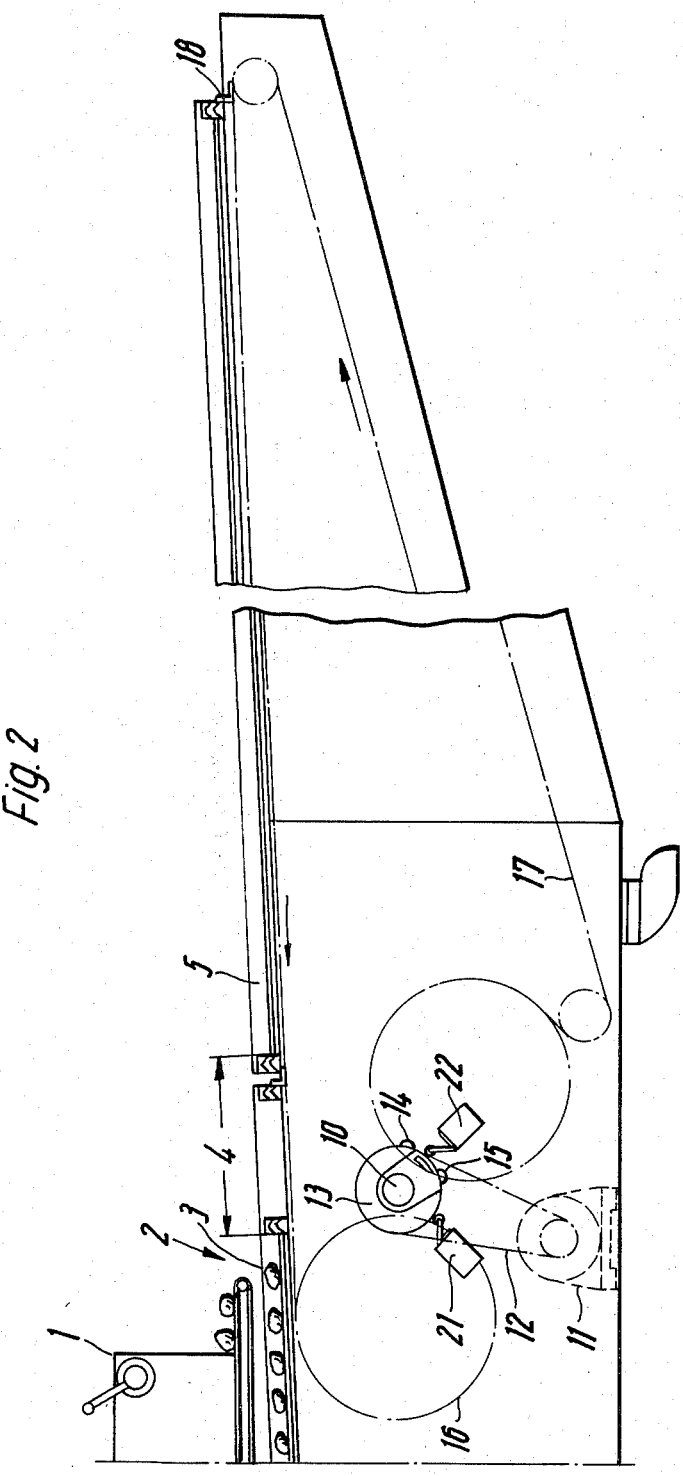
FIG. 2 shows a dough-dividing and handing-up device with filler station according to FIG. 1, viewed from the opposite side.

In FIG. 2 the same apparatus is shown as in FIG. 1, but considered from the opposite side. The drive motor 11, constituting an additional drive means, drives the spindle 10 through a chain or belt 12. On this spindle 10 a control or cam disc 13 is situated which has switch elements, formed as cams 14 and 15, at specific intervals on its circumference. On the drive spindle 10 there is a toothed-wheel gearing (not further illustrated in FIG. 2) which is operatively connected with the chain drive wheel 16 over which a chain 17 runs, which chain 17 is provided at suitable intervals with engaging members 18 which grasp the carriers 5 or 3 and move them in the direction of the arrow through the filler station.

Figure 3:
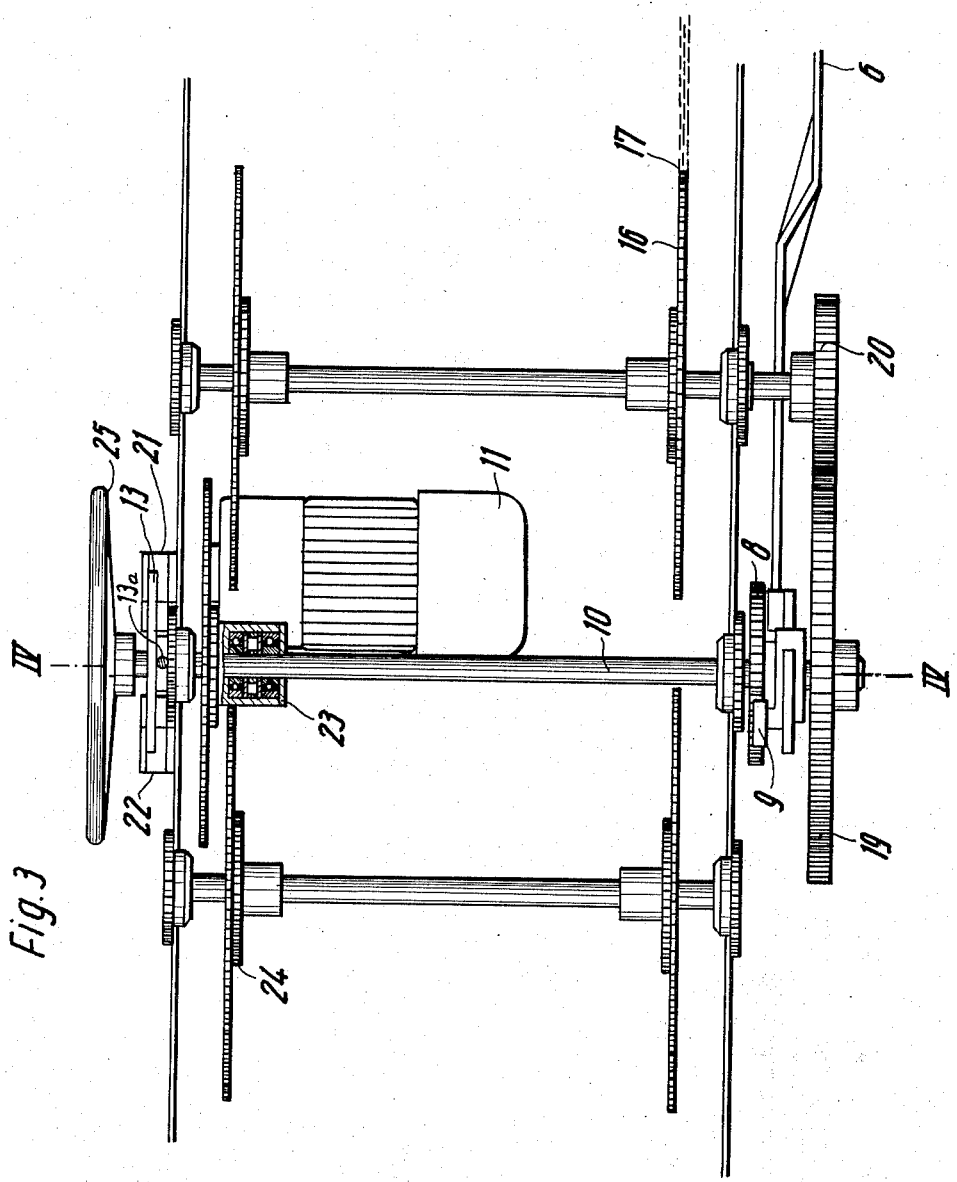

FIG. 3 shows a plan view of the additional drive and control apparatus according to the invention for the achievement of a variation of the transport step length and/or of the transport speed of the carriers 3 and 5. As was already to be seen from FIG. 1, the linkage 6 acts through the engaging finger 9 upon the detent wheel 8, so that the spindle 10 is rotated step by step. The gear wheel 19 connected with the spindle 10 meshes with a gear wheel 20 which is correspondingly formed and arranged and which drives the chain drive wheel 16 and thus the chain 17. As could already be seen from FIGS. 1 and 2, the control disc 13, the cams of which actuate the feeler switches 21 and 22, is mounted on the spindle 10 for rotation therewith.

These feeler switches are connected, in a circuit arrangement which is not further illustrated, both with the main drive motor of the dough-dividing and handing-up device and with the additional drive motor 11. The drive motor 11 in turn acts, in the switched-on condition, upon a freewheel (overruning clutch) 23 situated on the spindle 10, so that the spindle 10 can be rotated in the same direction as by the main drive. 24 designates a chain-reversing wheel.

For further clarifying the invention in FIG. 4 a section along the line 4 — 4 in FIG. 3 is reproduced, from which the drive motor 11, the spindle 10 and the freewheel 23 may be seen. 25 designates a hand wheel which is arranged to be capable of acting upon the main spindle so that the position of the switch elements 14 and 15 on the control disc 13 and the engaging members 18 on the chain 17 may be adjusted relative to the position of the carriers 3 and 5 in relation to the filler station, with the main drive shut off.

Now the apparatus according to the invention operates as follows : When the end part of a carrier 3 leaves the filler station 1 and an empty position 4 reaches the latter, a cam 15 exerts a switching action upon a mechanical contact of the switch 22, whereby the main drive of the dough-dividing and handing-up device is switched off and the motor 11 is switched on at the same time. Stated differently, the actuation of the switch 22 by the cam 15 causes deactivation of the main drive and activation of the motor 11. The motor 11 acts upon the freewheel 23, so that the spindle 10 is now driven by the motor 11 in the same direction but with a varied speed and/or step sequence. Thus the empty position 4 is introduced into the filler station in an appropriate time, according to the adjustment of the drive 11. When the head part of the empty carrier 5 reaches the filler station, an appropriately arranged cam on the control disc 13 actuates an appropriate switch member of the switches 21 or 22 and the drive 11 serving for effecting the variation of the transport step length and/or of the transport speed of the carriers is switched off and at the same time the main drive is switched on. Thus, now the motor 11 is deactivated and the main drive is activated.

Thus the carrier 5 is now conducted with the same speed as the carrier 3 through the filler station 1, while the empty position 4 moves through the filler station with a different speed, which however is permissible for the dough parts on the carrier 3. The increased speed of travel of the empty positions, in comparison with the normal filling speed, is advantageously so selected that the dough parts in the carrier 3 are not subjected to any unacceptable movement due to an increased acceleration. By the design of the drive motor 11, the size of the control disc 13 and of the cam intervals on this control disc, both the size of the empty position 4 and the speed with which this is to be conducted through the filler station can be appropriately set. This can be effected for example in that the control disc 13 is replaced by another control disc. A further possibility consists in that the cams are displaceably arranged on the control disc. For this purpose the control disc 13 may be releasably tightened to the spindle 10, for example, by means of a screw 13a.

With the above described apparatus, the dough-dividing and handing-up device with its filler station becomes completely independent of the output capacity of an operator, so that the capacity of the overall installation can be exploited to the maximum. Moreover the apparatus according to the invention works fully automatically and can be adapted to all requirements due to the variability of the corresponding control elements. Since the elements required for the apparatus are of a conventional nature, the apparatus can be produced cheaply, and may be installed as an addition to already existing machines.

It will be understood that the above description of the present invention is susceptible to various modification changes and adaptations.

What is claimed is:

1. Apparatus for the transport of carriers intended for the reception of elements to be transported, comprising conveying means on which said carriers are transported, a main drive motor for moving said conveying means, a main spindle, a detent disc mounted on said main spindle for rotation therewith, a detent for rotating said detent disc step by step, a linkage operating said detent and driven by said main drive motor, a control disc mounted for rotation with said main spindle, switch elements on said control disc, switches actuatable by said switch elements at predetermined times, an additional drive motor for varying the transport movement of said conveying means and actuated by said switches, and means for operatively connecting said additional drive motor to said spindle.

2. Apparatus as defined in claim 1, said means for operatively connecting said additional drive motor to said spindle comprising a freewheel device operatively connected to said main spindle to drive said main spindle in the same direction as it is driven by said main drive motor and actuated by said additional drive motor when said additional drive motor is actuated.

3. Apparatus as defined in claim 1 and comprising means for replaceably mounting said control disc on said main spindle.

4. Apparatus as defined in claim 1, wherein said switch elements comprise cams variably arranged on said control disc.

5. Apparatus as defined in claim 1, said conveying means comprising a chain system for the transport of said carriers, a chain drive spindle for driving said chain system and gearing for drivably connecting said chain drive spindle to said main spindle.

6. Apparatus as defined in claim 5, further comprising engaging members for engaging and driving said carriers and mounted on said chain system at positions dependent on the length of said carriers.

7. Apparatus as defined in claim 6, further comprising an adjusting device mounted on said main spindle and actuatable for adjusting the position of said switch elements on said control disc and the position of said engaging members on said chain system in relation to the position of said carriers relative to a filler station for said carriers when said main drive motor is shut off.

8. Apparatus as defined in claim 6, further comprising a magazine from which said engaging members remove said carriers and a filler station through which said carriers are moved by said engaging members.

9. Apparatus for the transport of carriers intended for the reception of elements to be transported, comprising conveying means on which said carriers are transported; a filler station at which said elements are to be loaded onto said carriers; main drive means for moving said conveying means; additional drive means for varying the transport movement of said conveying means; and control means including a plurality of switch devices for automatically actuating said additional drive means when a space defined by two adjacent carriers on said conveying means is passing said filler station and for restoring the original drive condition of said carriers after said additional drive means has been actuated for a predetermined time.

10. Apparatus for the transport of carriers in a combined dough preparing machine that includes a filler station in which prepared dough pieces are deposited on successive carriers, comprising conveying means on which said carriers, each separated from the other by an empty position, are transported in succession; main drive means for moving said conveying means with a first transport movement while dough pieces are being loaded on a carrier passing through said filler station; additional drive means for moving said conveying means with a second transport movement; and control means for automatically deactivating said main drive means and simultaneously activating said additional drive means when an empty position reaches said filler station and for automatically deactivating said additional drive means and activating said main drive means when a leading portion of a successive carrier reaches said filler station.

11. Apparatus as defined in claim 10, wherein said control means includes adjustable means for varying the length of said first and said second transport movements.

12. Apparatus as defined in claim 11, including a spindle; means for drivingly connecting said spindle to said conveying means; means for drivingly connecting said main drive means to said spindle; means for drivingly connecting said additional drive means to said spindle; said control means including a control disc mounted on said spindle for rotation therewith, cam means carried by said control disc and stationary switch means cooperating with said cam means for controlling the selective activation and deactivation of said main and additional drive means.

* * * * *